Dec. 29, 1959 — R. DESCARRIES — 2,919,332
COMBINED HANDLE AND SWITCH CONTROL
Filed Sept. 19, 1957
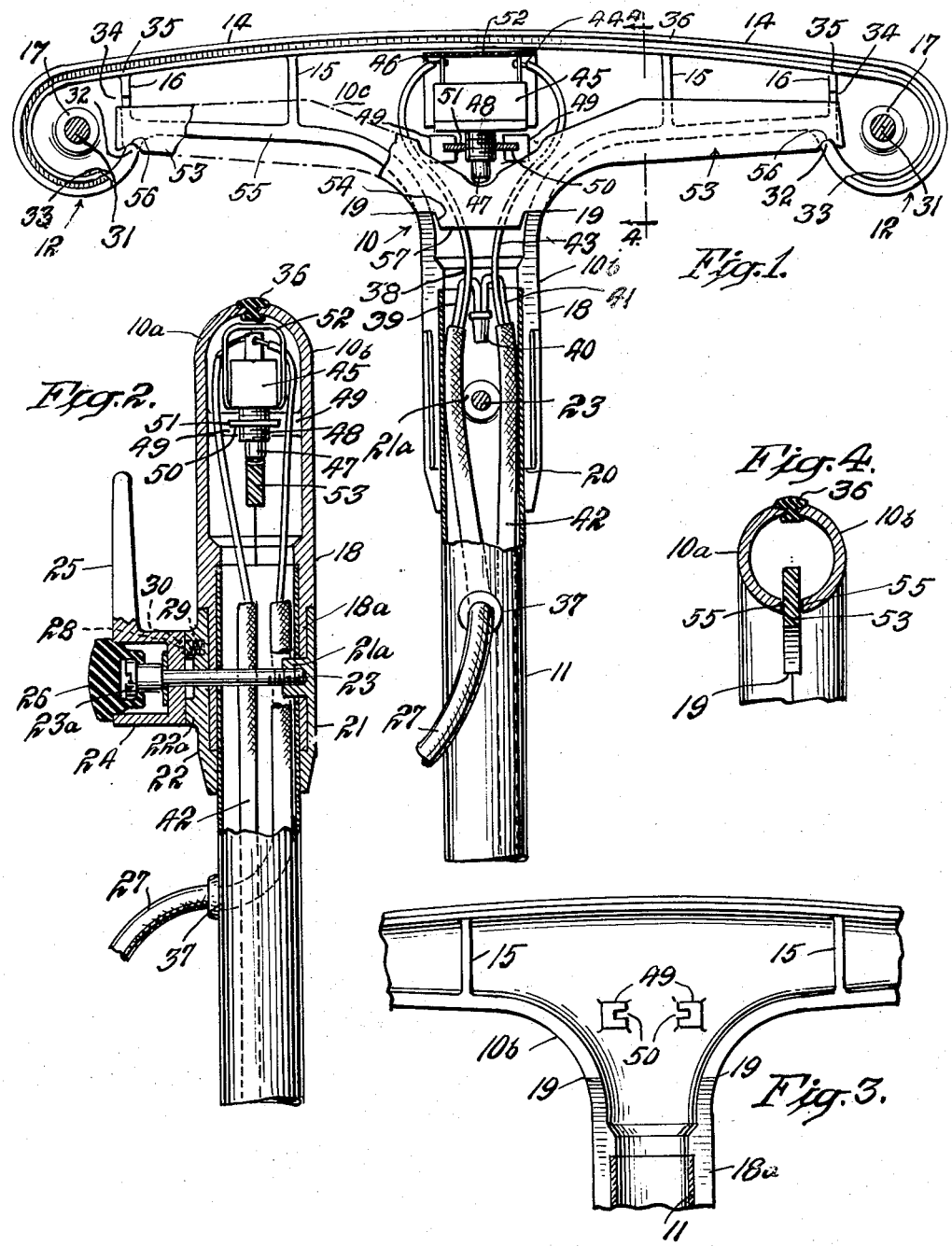
INVENTOR.
Raymond Descarries
BY
Edmund A. Newander
his ATTORNEY

United States Patent Office 2,919,332
Patented Dec. 29, 1959

2,919,332

COMBINED HANDLE AND SWITCH CONTROL

Raymond Descarries, Montreal, Quebec, Canada, assignor to Aktiebolaget Electrolux, Stockholm, Sweden, a corporation of Sweden Application September 19, 1957, Serial No. 684,880

Claims priority, application Canada September 21, 1956

6 Claims. (Cl. 200—157)

My invention relates to a combined handle and switch control, and more particularly to a handle provided with a normally open switch which closes when the handle is grasped by an individual and opens when the handle is released.

The invention, together with the objects and advantages thereof, will become apparent from the following description, and the features of novelty which characterize the invention will be pointed out with particularity in the claims annexed to and forming a part of this specification.

For a better understanding of the invention, reference may be had to the following description taken in connection with the accompanying drawing, in which:

Fig. 1 is a front elevation view, partly broken away, of a handle provided with a switch control embodying the invention;

Fig. 2 is a side elevation view, partly broken away and in section, of the handle and switch control shown in Fig. 1;

Fig. 3 is an enlarged fragmentary view of a part of the handle shown in Figs. 1 and 2 to illustrate details more clearly; and Fig. 4 is a sectional view taken at line 4—4 of Fig. 1.

Referring to the drawing, I have shown my invention in connection with a T-shaped handle 10 which is fixed to one end of a hollow elongated tubular member 11 for manipulating over a surface to be treated a motor-operated domestic appliance or like device to which the member 11 is adapted to be pivotally connected. The handle 10 forms a cross bar at the outer free end of the elongated member 11, each half of the handle being tapered in a direction from the center line of the member 11 and formed with an enlarged knob 12 at the outer end thereof to provide suitable hand grip portions 14.

In accordance with my invention, the T-shaped handle 10 comprises a pair of hollow T-shaped complementary parts 10a and 10b, the cavity of each part having re-enforcing ribs 15 and 16 at the vicinity of the hand grip portions 14 and an apertured boss or lug 17 at the region of the knobs 12. When the complementary parts 10a and 10b of the handle are positioned about the end of the hollow elongated tubular member 11, the two halves of the center leg 18 of the T-shaped handle fit snugly about the tubular member 11 and are in abutting relation from the region 19 to the region 20 at the extreme outer end of the center leg 18.

The two halves of the center leg 18 are fixed to the tubular member 11 by a clamp formed of two sections 21 and 22, each of which is of semi-cylindrical form and fits snugly over the center leg 18 at the extreme outer end portion 18a which is of reduced size. The hollow tubular member 11 is formed with openings diametrically opposite one another, one of which receives a boss or projection 21a formed at the inner wall surface of the clamp section 21. The clamp section 22 is apertured to receive a cap screw 23 which passes through the other opening in the tubular member 11 and is in threaded engagement with the boss 21a. In addition to holding the clamp sections 21 and 22 tightly together on the tubular member 11, the cap screw 23 serves to fix to the tubular member 11 a hollow cup-shaped part 24 having an arm 25 extending radially therefrom.

The clamp section 22 is formed with a boss 22a at the exterior thereof having an essentially flat surface against which the bottom of the cup-shaped part 24 is held by the cap screw 23. As shown in Fig. 2, the head 23a of the cap screw 23 is positioned within the cup-shaped part 24 and may be concealed from view by a cap 26 formed of resilient material like rubber, for example, which closes the open end of the cup-shaped part and is frictionally held on the head 23a of the cap screw 23 and readily removable therefrom by snap action.

An electrical cord 27, only a part of which is shown in Fig. 1, is provided to connect the electrical appliance to a suitable source of electrical energy. When not in use, the electrical cord may be wound about a pair of spaced apart hook-like members fixed to the elongated member 11. The arm 25 may be employed as one of the hook-like members about which the electrical cord 27 is adapted to be wound. In order to prevent accidental movement of the arm 25, the boss 22a on clamp section 22 may be apertured to receive a small ball 28 which is spring pressed at 29 into a shallow recess 30 at the bottom of the cup-shaped part 24, thus positioning the arm 25 as illustrated in Fig. 2 so that successive turns of the electrical cord 27 may be wound thereon.

When the handle parts 10a and 10b are in the position shown in Fig. 2 and clamped together by the clamp sections 21 and 22, the faces of the bosses 17 at the rounded outer ends of the handle are in abutting relation. The apertured bosses 17 in one of the handle parts 10a and 10b may be threaded to receive threaded tightening screws 31 which pass through the apertured bosses 17 in the other handle part and have heads or caps (not shown) accessible in recessed regions at the exterior surface of the other handle part.

When the complementary handle parts 10a and 10b are held together in the position shown in Fig. 2, the outer ends of the cross arm are in abutting relation between the regions 32 and 33, and between the regions 34 and 35 of the ribs 16. When the hollow handle part 10b is viewed at the cavity side thereof, as illustrated in Fig. 1, the bosses 17, the wall sections extending from 19 to 20 and from 32 to 33, and the sections of ribs 16 from 34 to 35 are raised with respect to the other wall sections and ribs of the handle part 10b. When the complementary handle parts 10a and 10b are held together, as seen in Fig. 2, the raised areas of handle part 10b just described abut and contact similar raised areas of handle part 10a, and openings or gaps are formed between other opposing ribs and wall sections of the complementary handle parts.

In Fig. 1, in which the cavity 10c of handle part 10b is seen, slots or gaps are formed between the complementary handle parts, when the handle 10 is assembled, at the wall sections from 19 to 32, at the wall section from 33 about a rounded end of the handle part to 33 at the opposite rounded end of the handle part, and at the ribs 16 from 32 to 34. As best shown in Fig. 2, the gap between the complementary handle parts extending between the regions 33 about the outer wall section of the cross arm may be closed and sealed by a flexible trim strip 36 which is essentially H-shaped, the grooves of which receive the opposing wall sections of the complementary handle parts 10a and 10b. The raised wall sections of the handle part 10b may be undercut at the regions 33 in such a manner (not shown) that the ends of the trim strip 36, which may be formed of rubber or a suitable plastic, for example, will pass through channeled areas into the interior of the handle part 10b without the abutting relation of the wall sections of handle parts 10a and 10b which extend from 32 to 33 being disturbed.

The electrical cord 27, which extends into the interior of the hollow tubular member 11 through an opening 37 therein, comprises two electrical conductors 38 and 39 insulated from one another, one of which is connected at 40 to a conductor 41 of an electrical cord 42 that extends through the tubular member 11 and is adapted to be connected to an electric motor (not shown). The other conductor 43 of the cord 42, which is also adapted to be connected at one end to the motor, is connected at its other end to one terminal 44 of a switch 45, the opposite terminal 46 of which is connected to the conductor 38. Hence, when the switch 45 is closed, a circuit is completed through the conductors 39 and 41, the motor, conductor 43, and switch 45 to the other conductor 38 of the electrical cord 27.

The switch 45 is provided with a movable plunger 47 which is movable within a hollow sleeve 48 fixed to the switch casing. The switch 45 may be of a well-known micro-switch type which is operated with only a relatively short movement of the plunger or pin 47. The switch 45 is spring biased to a first position to open the electrical circuit just described and disconnect the motor from the source of electrical energy. Such biasing action of the switch 45 is effective to move the plunger 47 downwardly in Fig. 1. When upward movement is imparted to plunger 47, in a manner to be described presently, the switch is moved to a second closed position to complete the electrical circuit for the motor adapted to be connected to the lower ends of conductors 41 and 43. When upward movement is no longer imparted to the plunger 47, it is spring biased to the position shown in Fig. 1, such biasing action causing the switch 45 to move to its open position.

The switch 45 is mounted within the interior of the hollow handle 10 by a pair of bosses or raised parts 49 formed in each of the complementary handle parts 10a and 10b. The bosses 49 of the handle parts 10a and 10b are directly opposite each other and in abutting relation when the handle parts are connected together. The bosses 49 extend upwardly within the cavity of each handle part and are formed with slots 50, as seen in Fig. 3. The slots 50 receive the opposite sides of a flat plate 51 which is apertured and in threaded engagement with the externally threaded hollow sleeve 48. By shifting the location of plate 51 on the sleeve 48, the extreme bottom end of plunger 47 can be raised or lowered from the position shown in Fig. 1. As seen in Fig. 2, the slots 50 are of less depth than the bosses 49, so that the plate 51 can be tightly clamped between the complementary handle parts 10a and 10b when the latter are mounted on the tubular member 11. In order to shield the terminals 44 and 46 and conductors 43 and 38 connected thereto from the handle parts 10a and 10b, a protective housing 52 formed of suitable insulating material and of inverted U-form may be provided about the switch 45 and its terminals 44 and 46.

In accord with my invention, the handle 10 is provided with an elongated bar 53 which moves upwardly in Fig. 1 when the hand grip portions 14 are grasped so as to impart upward movement to the plunger 47 to close the switch 45 and complete the electrical circuit for the motor adapted to be connected to the conductors 41 and 43. The bar 53 is mounted in the handle 10 in such a manner that it will move in the opposite downward direction in Fig. 1 the instant the hand grip portions 14 are released, whereby the switch 45 will open the electrical circuit and stop the motor.

The movable bar 53, which is of the shape shown in Fig. 1, is held in position within the hollow handle 10 and cannot be removed therefrom unless the complementary handle parts 10a and 10b are disconnected and separated from one another. When the plunger 47 is in the position shown in Fig. 1 and the switch 45 is open, the plunger is spring biased to its lower position with the extreme lower end thereof at the vicinity of an intermediate part of one edge of the bar 53. The bar 53 is essentially Y-shaped with the plunger located adjacent the region of the bar which is at the crotch formed by the widely separated side arms of the bar. The central leg of the Y-shaped bar 53 is relatively short and stubby and notched at its corners at 54. The notched corners 54 of bar 53 are positioned at the ends of slots 55 which are formed between the complementary handle parts 10a and 10b and extend along their wall sections at each side of the handle 10 from 19 to 32.

The extreme outer ends of the bar are notched or recessed at 56 so as to fit into position at the outer ends of the slots 55. The outer ends of the bar 53 are movable in slots formed between opposing ribs 16 in the handle parts 10a and 10b from the positions shown in Fig. 1 to positions at which the top edge of the bar engages stops formed at the regions 34 of the raised sections of opposing ribs 16 which abut and engage one another. When the bar 53 is moved upwardly in Fig. 1 so that its top edge engages the regions 34 of the slots formed between opposing ribs 16, the notches 56 are not completely removed from the regions 32 of the slots, so that the bar cannot be moved in the direction of its length in an effort to remove it from the interior of the handle 10. Likewise, the central leg of the Y-shaped bar is formed with a tab 57 which extends into the hollow central leg 18 of the T-shaped handle below the lower ends of the slots 55, whereby free endwise movement of the bar is inhibited when the ends of the bar are moved upwardly from the position shown in Fig. 1.

As shown in Fig. 1, longitudinally extending sections of the bar 53 extend outside the handle 10 through the slots 55. When an individual grips both hand grip portions 14, the fingers naturally tend to pull the bar 53 bodily upward from the position shown in Fig. 1 to the position at which the ends of the bar engage the stops formed at the regions 34 of the ribs 16. In this way, upward movement is imparted to the plunger 47 to close the switch 45 and complete the circuit for the motor adapted to be connected to the conductors 41 and 43. Only a relatively short movement of the plunger 47 is required to close the switch 45, which, as previously explained, is spring biased to cause the plunger to move back to the position shown in Fig. 1. The bar 53 may be formed of material which is relatively light in weight, such as a suitable plastic, for example, so that the biasing action of the switch, while not of great magnitude, will be adequate to impart movement to the bar 53 to return it to the position shown in Fig. 1 when it is released.

The preferred embodiment of the invention illustrated and described possesses the advantage that the switch 45 can be closed when an individual grips the handle 10 with only one hand. When an individual grasps the left-hand hand grip portion 14 of handle 10 and upward movement is imparted to the left-hand section of bar 53, the bar will pivot about the right-hand notch 56. Such pivoting movement of the bar 53 will be adequate to impart upward movement to plunger 47 to close the switch 45. When the left-hand section of bar 53 is released, the spring biased switch will be effective to move the bar back to the position shown in Fig. 1. Conversely, when the right-hand section of the bar 53 is raised, it will pivot about the left-hand notch 56 in Fig. 1 and move plunger 47 a sufficient distance to close the switch 45; and, when the bar 53 is released, it will again move back to the position shown in Fig. 1.

Although I have shown my improved handle and switch control in connection with a motor-operated domestic appliance or like device, I do not desire my invention to be limited to the particular arrangement set forth, and I intend in the claims to cover all modifications which do not depart from the spirit and scope of the invention.

What is claimed is:

1. For use with a device having an electrical circuit, an apertured hollow handle, said handle being T-shaped and including a cross arm and a leg intermediate the ends of said arm which is perpendicular thereto, a normally open switch adapted to be connected in the electrical circuit, said normally open switch having an operating element which is biased to a switch open position and movable to a switch closed position, means for mounting said switch in said cross arm at the vicinity of said leg, a manually movable elongated member which projects exteriorly of said apertured hollow handle, said hollow handle and member being so constructed and arranged that said member is movable between outer and inner positions in said handle and is normally biased to its outer position by said switch operating element, said apertured hollow handle including a slotted section in each half of said cross arm, said elongated member extending lengthwise of said cross arm and projecting through said slotted sections exteriorly of said handle, each half of said cross arm and the part of said elongated member coacting therewith providing a hand grip, said switch operating element being movable from its switch open position to its switch closed position responsive to inward movement imparted to said member by the fingers when either one of said hand grips is clasped, and said switch operating element being movable from its switch closed position to its switch open position responsive to movement of said member to its outer position upon release thereof by the fingers when said one hand grip is unclasped.

2. For use with a device having an electrical circuit, an apertured hollow handle, said handle being T-shaped and including a cross arm and a leg intermediate the ends of said arm which is perpendicular thereto, a normally open switch adapted to be connected in the electrical circuit, said normally open switch having an operating element which is biased to a switch open position and movable to a switch closed position, means for mounting said switch in said cross arm at the vicinity of said leg, a manually movable elongated member which projects exteriorly of said apertured hollow handle, said hollow handle and member being so constructed and arranged that said member is movable between outer and inner positions in said handle and is normally biased to its outer position by said switch operating element, said apertured hollow handle including a slotted section in each half of said cross arm, said elongated member extending lengthwise of said cross arm and projecting through said slotted sections exteriorly of said handle, each half of said cross arm and the part of said elongated member coacting therewith providing a hand grip, said switch operating element being movable from its switch open position to its switch closed position responsive to inward movement imparted to said member by the fingers when both of said hand grips are clasped, and said switch operating element being movable from its switch closed position to its switch open position responsive to movement of said member to its outer position upon release thereof by the fingers when both of said hand grips are unclasped.

3. For use with a device having an electrical circuit, an elongated apertured hollow handle, a switch adapted to be connected in an electrical circuit, said switch having an operating element which is biased to a switch open position and movable to a switch closed position, means for mounting said switch within said hollow handle at a region intermediate the ends thereof, a manually movable elongated member which projects exteriorly of said apertured hollow handle, said hollow handle and member being so constructed and arranged that each end of said member is movable between inner and outer positions in said handle and is normally biased to its outer position by said switch operating element when the latter is in its switch open position, the portions of said apertured hollow handle at opposite sides of said switch each including a slotted section, said elongated member extending lengthwise of said hollow handle and projecting through said slotted sections exteriorly of said handle, each slotted section of said hollow handle and the part of said elongated member coacting therewith providing a hand grip, said switch operating element being movable from its switch open position to its switch closed position responsive to inward movement imparted to said member by the fingers when either one of said hand grips is clasped, and said switch operating element being movable from its switch closed position to its switch open position when said member is released by the fingers at said one hand grip and both movable ends of said member are biased to their outer positions.

4. For use with a device having an electrical circuit, an elongated apertured hollow handle, a switch adapted to be connected in an electrical circuit, said switch having an operating element which is biased to a switch open position and movable to a switch closed position, means for mounting said switch within said hollow handle at a region intermediate the ends thereof, a manually movable elongated member which projects exteriorly of said apertured hollow handle, said hollow handle and member being so constructed and arranged that each end of said member is movable between inner and outer positions in said handle and is normally biased to its outer position by said switch operating element when the latter is in its switch open position, the portions of said apertured hollow handle at opposite sides of said switch each including a slotted section, said elongated member extending lengthwise of said hollow handle and projecting through said slotted sections exteriorly of said handle, each slotted section of said hollow handle and the part of said elongated member coacting therewith providing a hand grip, said switch operating element being movable from its switch open position to its switch closed position responsive to inward movement imparted to said member by the fingers when both of said hand grips are clasped, and said switch operating element being movable from its switch closed position to its switch open position when said member is released by the fingers at both of said hand grips and both movable ends of said member are biased to their outer positions.

5. For use with a device having an electrical circuit, an elongated hollow handle slotted in a lengthwise direction, a normally open switch adapted to be connected in the electrical circuit, said switch having an operating element which is biased to a switch open position and movable to a switch closed position, an elongated member extending lengthwise within said slotted hollow handle and projecting exteriorly of said handle, means for mounting said switch within said handle at a region intermediate the ends of said elongated member, said member being so constructed and arranged that each end of said member is angularly movable between inner and outer positions in said handle about a pivot at the opposite end of said member and each end of said member is normally biased to its outer position by means including said switch operating element when the latter is in its switch open position, said slotted hollow handle and portion of said elongated member coacting therewith and projecting exteriorly of said handle providing a hand grip, said switch operating member being movable from its switch open position to its switch closed position responsive to inward movement imparted manually to said member by the fingers when said hand grip is clasped, and said switch operating element being movable from its switch closed position to its switch open position when said member is released by the fingers at said hand grip and both of the movable ends of said member are biased to their outer positions.

6. For use with a device having an electrical circuit, an elongated hollow handle slotted in a lengthwise direction, a switch adapted to be connected in the electrical circuit, said switch having an operating element which is biased to a switch open position and movable to a switch closed position, means for mounting said switch within said handle, an elongated member extending lengthwise within said slotted hollow handle and projecting exteriorly of said handle, said member being so constructed and arranged that each end of said member is angularly movable between inner and outer positions in said handle about a pivot at the opposite end of said member and each end of said member is normally biased to its outer position by means including said switch operating element when the latter is in its switch open position, said slotted hollow handle and elongated member coacting therewith and projecting exteriorly of said handle providing a pair of hand grips, said switch operating member being movable from its switch open to its switch closed position responsive to inward movement imparted to said member by the fingers when at least one of said hand grips is clasped, and said switch operating element being movable from its switch closed position to its switch open position when said member is released by the fingers at said one hand grip and both of the movable ends of said member are biased to their outer positions.

References Cited in the file of this patent
UNITED STATES PATENTS

| | | |
|---|---|---|
| 2,211,603 | Lang | Aug. 13, 1940 |
| 2,487,093 | Bright | Nov. 8, 1949 |
| 2,630,509 | Arones | Mar. 3, 1953 |
| 2,711,461 | Happe | June 21, 1955 |
| 2,719,238 | Collura | Sept. 27, 1955 |